United States Patent [19]
Murphy, Jr. et al.

[11] Patent Number: 5,121,109
[45] Date of Patent: Jun. 9, 1992

[54] ADJUSTABLE SET POINT SIGNALLING GAUGE

[75] Inventors: Frank W. Murphy, Jr.; James R. Francisco, both of Tulsa; Troy Teague, Collinsville, all of Okla.

[73] Assignee: Murphy Management Inc., Tulsa, Okla.

[21] Appl. No.: 580,975

[22] Filed: Sep. 12, 1990

Related U.S. Application Data

[63] Continuation-in-part of Ser. No. 399,810, Aug. 29, 1989, Pat. No. 4,975,687.

[51] Int. Cl.$^5$ .............................................. G08B 21/00
[52] U.S. Cl. ..................................... 340/688; 335/205; 335/206; 357/26
[58] Field of Search ................. 340/688; 335/205, 206; 357/26

[56] References Cited

U.S. PATENT DOCUMENTS

| | | | |
|---|---|---|---|
| 2,923,786 | 2/1960 | Jones | 340/688 |
| 3,129,416 | 4/1964 | Freedman | 340/688 |
| 4,482,884 | 11/1984 | Hauschild et al. | 340/688 |
| 4,616,851 | 9/1986 | Hines | 340/688 |
| 4,975,687 | 12/1990 | Murphy, Jr. et al. | 340/688 |

*Primary Examiner*—Glen R. Swann, III
*Attorney, Agent, or Firm*—Fulbright & Jaworski

[57] ABSTRACT

An adjustable signalling gauge may utilize a non-captivating, magnetically actuated switch element which is mounted in an influence zone of the path of a magnet carried by an indicating pointer of a gauge. The gauge may be easily adjusted by an indirect adjustment mechanism. The adjustment may be by a reducing gear. Indirect adjustment effectively allows a reduction in the torque required to change the switching threshold.

31 Claims, 5 Drawing Sheets

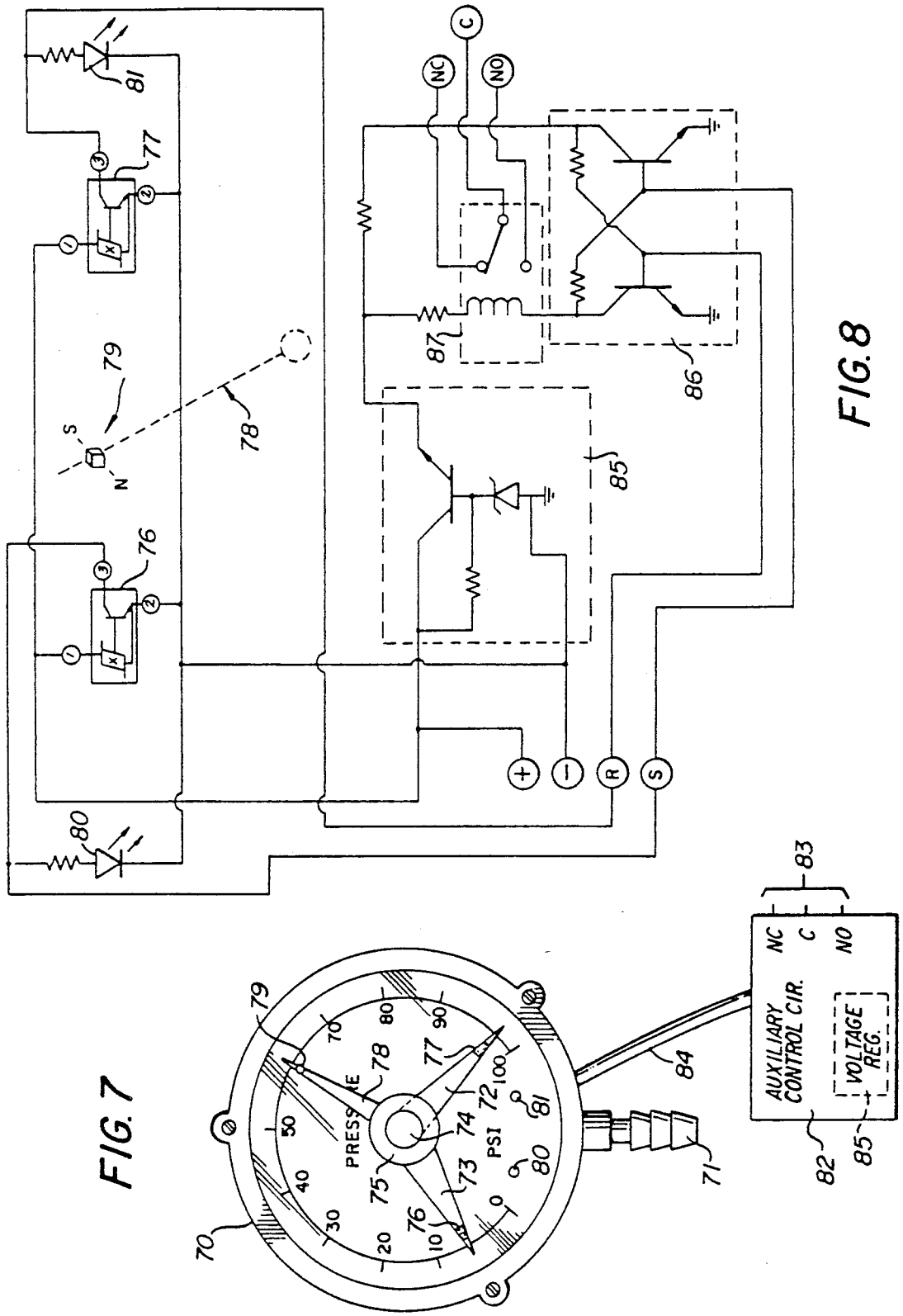

ADJUSTABLE SET POINT SIGNALLING GAUGE

CROSS REFERENCE TO RELATED APPLICATIONS

This is a continuation-in-part of U.S. application Ser. No. 399,810, filed Aug. 29, 1989, now U.S. Pat. No. 4,975,687.

BACKGROUND OF THE INVENTION

1. Field of the Invention

The invention relates to a signalling gauge and more particularly to a signalling gauge pointer adjustment mechanism which has applications for use in a magnetically activated signalling gauge where the visual indication of the reading is not affected by a magnetic field of an actuating magnet.

2. Description of the Related Technology

Signalling gauges are instruments of meters which are utilized to monitor various parameters such as temperature, pressure, liquid levels or various electric properties. These instruments are specifically configured to give an indication when the monitor condition reaches some predetermined point.

In prior signalling gauges, the predetermined point is typically detected by electromechanical contacts. One contact is located on the reading pointer of the meter. A second contact may be either fixed or adjustable and located in the travel path of the pointer contact. U.S. Pat. Nos. 3,586,799 and 4,021,627, the disclosures of which are expressly incorporated herein, show electromechanical contact signalling gauges. (Furthermore, various gauges of this type have been sold under the registered trademark SWITCHGAGE ® by Frank W. Murphy MFR., Inc.)

Electromechanical signalling gauges are quite adequate for a great number of purposes. They do, however, possess a number of shortcomings. The most significant shortcoming is the electrical contact integrity. The lifespan of electromechanical contacts is finite and depends on the number of operations in the environment to which they are exposed. Exposure to atmospheric conditions containing dirt, dust or various chemical gases can significantly degrade contact integrity and negatively impact on contact life span. As a result, frequent contact cleaning and/or replacement is necessitated.

A further drawback is the effect the mechanical contact has on the movement integrity. In order to establish or break electrical contact, a force significant to the operation and accuracy of the meter must often be applied to the indicating pointer. This precludes or significantly complicates the utilization of sensitive or balanced meter movements in signalling gauge applications. Electromechanical contacts are quite bulky and do not lend themselves to installation on aircoil or D'Arsonval movements such as those found in automotive instruments or many electrical condition monitoring instruments.

Another significant disadvantage of electromechanical contacts is the possibility of spark production. According to the American Petroleum Institute, Class I Division II environments classified as hazardous may not contain electrical contacts which are capable of producing a spark. Such a contact may result in ignition of flammable gases which may be present. Standard electric or electromechanical contact signalling gauges must be isolated from this environment by either large, expensive explosion proof enclosures or electronic barriers.

Another disadvantage of conventional electromechanical contacts is the inability to efficiently switch low level digital milliamp levels. Recommended operating levels for electromechanical contacts are significantly higher than conventional digital switching signal levels. In addition, Hall sensors are less expensive than common electromechanical contacts.

Other signalling gauges have utilized opto-electronic sensors. This has not proved satisfactory in many applications because such gauges require hermetic sealing in order to operate for any period of time. Dust and dirt buildup significantly impairs the sensor, thereby rendering the gauge inoperative. The sealing provisions required add a significant expense to the production of the instruments. Utilization of Hall effect elements is more efficient than opto-electronic sensors. Hall sensors are not normally affected by dirt or light levels.

Conventional adjustable contacts or pointers in signalling gauges are directly connected to an adjustment knob or handle. U.S. Pat. No. 4,021,627 shows a gauge with an adjustable set point contact. Prior contact adjustments have been performed by adjusting contacts with a knob or other adjustment device which is directly connected to a switching contact or element. The difficulty in accurately adjusting such a contact has been a significant drawback to prior adjustment mechanisms. The adjustment tension or force required to adjust a contact must be high enough to prevent a contact from becoming maladjusted by inadvertence or by the force of vibrations. High adjustment tension is a drawback in that it makes accurate adjustment difficult and burdensome. Locking mechanisms such as set screws utilized to avoid unwanted changes in contact position are cumbersome and reduce the ease of adjustment and normally require tools to make adjustments.

SUMMARY OF THE INVENTION

It is an object of the invention to enhance the operational characteristics of signalling gauges in view of the operational limitations inherent in the utilization of electromechanical and optical sensing contacts in a signalling gauge. The signalling gauge, according to the invention, is a unique, versatile device which may accurately operate over long periods of time in remote locations or hostile environments.

It is a further object of the invention to enhance the adjustability of the set point contacts or switch elements. This aspect of the invention may be utilized for adjustment of non-captivating magnetic switch elements as well as electromechanical, opto-electronic and conventional magnetic switch elements.

The signalling gauge is made up of a gauge movement which is arranged and connected to respond to a particular sensed condition. The sensed condition may be a pressure temperature level or electrical characteristic. Examples of various movements which may be utilized are diaphragm, Bourdon tube, or D'Arsonval type movements. The movement is connected to a reading pointer which typically passes over a gauge face plate to provide a visual reading of the sensed condition. A non-captivating, magnetically actuated switch element may be arranged to cooperate with a magnet, typically mounted on the indicating pointer in order to signal a predetermined reading of the meter movement. The non-captivating property of the switch element is significant in order to avoid influencing the meter reading or damaging the meter movement. The mechanical resistance of electromechanical contacts influences the indicating needle and, therefore, affects the reading and the output of the meter. Utilization of magnetic/mechanical switching element such as a reed switch also results in some mechanical influence on the indicating pointer or meter movement. Any such influence is to be avoided in order to prolong the lifespan of the meter and maintain reading integrity.

An example of a non-captivating, magnetically actuated switch element is a Hall effect switching device such as, for example, a Hall effect transistor, digital switch, or latch. The term "non-captivating" is intended to preclude elements where the magnetic interaction between a switch element and the actuating magnet results in a force tending either to retard or induce relative motion between the switching element and the actuating magnet path.

The actuating magnet may be a very small, lightweight element such as a 32.5 milligram or one gram magnet mounted on an indicating pointer. Various Hall effect elements may be utilized, such as a SPRAGUE UGS-3075U bipolar Hall effect digital latch or a UGS-3140U ultra-sensitive Hall effect switch, depending on desired circuit capabilities and properties.

The Hall effect switching device may be permanently mounted on a face plate to provide a switch point. Advantageously, the switching element may be recessed, flush mounted, or mounted beneath a face plate covering. It is necessary that the magnetically actuated switching element is mounted proximate to the magnet path and falls within the zone of influence of the magnet. Alternatively, switching elements may be mounted on variable pointers which may be adjusted according to desired operating parameters.

Typically, the signalling gauges are set up to operate in a slide-by mode where a flux axis of the actuating magnet may be either perpendicular or parallel to a travel path of the magnet. A bipolar latch and a magnet axially aligned with the travel path may be configured with a leading activating pole of the magnet on an increasing reading or with a trailing activating pole, depending on the application and switching requirements.

According to a preferred embodiment, a control circuit may be connected to one or more signalling gauges. The control circuit may control one or more functions depending on the operating parameters sensed by the signalling gauges. The control circuit may be a simple control circuit or a programmable logic controller.

The switching element may be connected to an indicator. The indicator may be provided to alert someone of the sensed condition. Such indicators may include visual or optical devices such as a lamp bulb or LED. The indicator may be an audio alarm such as a bell or a buzzer.

Typical applications of signalling gauges, according to the invention, include a variety of circuit applications. Signalling gauges, according to the invention, may be utilized to indicate or control an alarm upon detection of a predetermined condition such as a high or a low pressure condition in a fluid system, a high temperature or low fuel level condition in a piece of heavy machinery, or an excessive current load in an electrical circuit. The signalling gauges may also be utilized as part of a control circuit, for example, controlling a pump to maintain pressure within a predetermined range or as a monitor/alarm for a pipeline cathodic protection.

According to the invention the control systems or indicators may be responsive to a sensed threshold level. The threshold level may be changed by adjusting a set pointer. The adjustable set pointer may carry a switched element such as a Hall effect transistor or alternatively may carry a switch activating element such as a magnet. The enhanced adjustability of the current invention may be obtained by utilizing an indirect adjusting mechanism. Such a mechanism may be cog or gear driven arrangement. A reducing arrangement may be set up where an adjusting knob includes a small radius gear. The small radius gear may cooperate with a large radius gear connected to or carrying the adjustable switch element.

The indirect adjustment allows an adjustable set point contact to have a high adjustment tension and allows adjustment by assertion of a relatively small torque on an adjustment knob. The contemplated indirect adjustment may be accomplished through a reduction gear arrangement or other equivalent indirect adjustment elements. This configuration also allows use of a drive or a motor driven set point adjustment responsive to some other sensed condition. This configuration may be used where a temperature threshold is dependent on a fluctuating pressure. The threshold set point (temp.) may be driven by a sensed pressure. Additional features will become apparent from the description of the preferred embodiment

BRIEF DESCRIPTION OF THE DRAWINGS

FIG. 7 shows a multi-contact signalling gauge.

FIG. 8 shows a schematic circuit diagram for an alternative embodiment of a signalling gauge according to FIG. 7.

DETAILED DESCRIPTION OF THE PREFERRED EMBODIMENT

Figure 1:
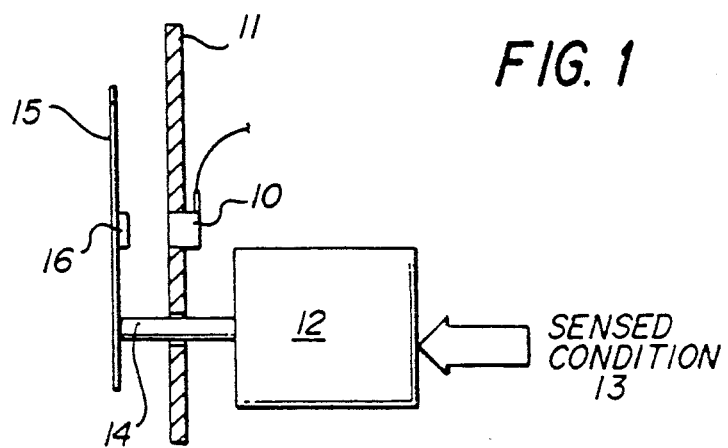
FIG. 1 shows a schematic of a signalling gauge according to the invention.
Figure 2:
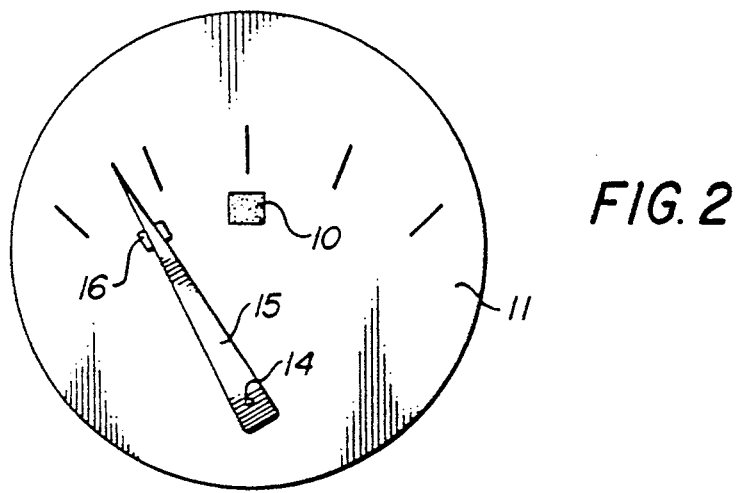
FIG. 2 shows a front view of the embodiment according to figure one.

FIGS. 1 and 2 schematically illustrate an embodiment of a signalling gauge with a flush mounted Hall effect switching device 10 arranged on a face plate 11 of the signalling gauge. A meter movement 12 is provided which responds to a sensed condition 13. The sensed condition 13 may be pressure in the case of a Bourdon tube movement or an electrical potential in the case of a D'Arsonval movement. The movement 12 translates the magnitude of the sensed condition into rotational motion of a shaft 14 connected to an indicating pointer 15. A magnet 16 is mounted on the indicating pointer in such a fashion that its path carries it close enough to the Hall effect switching device 10 to influence switching of the element 10.

Figure 3:
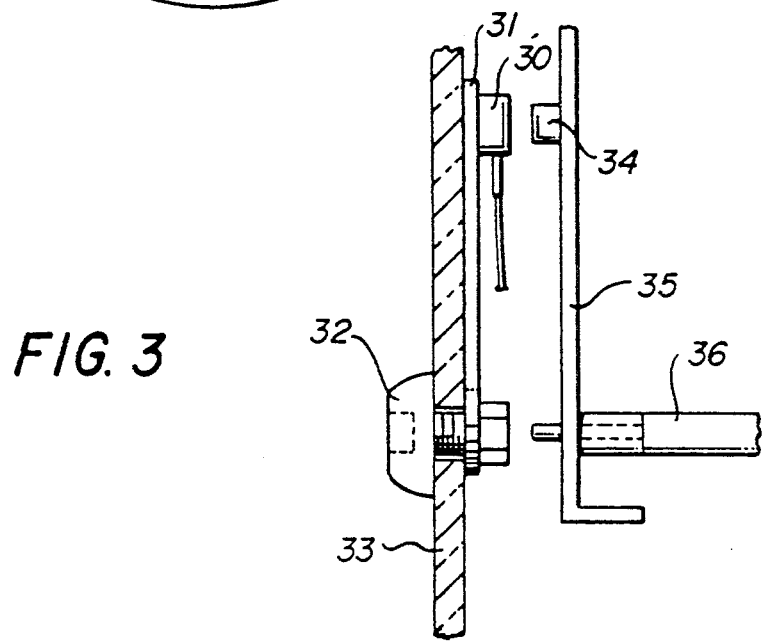
FIG. 3 shows an alternative embodiment with an adjustable contact arm.

FIG. 3 shows an embodiment with a Hall effect switching unit 30 mounted on an adjustable arm 31. The adjustable arm 31 is connected to an adjusting knob 32 which extends through a clear lens 33. The adjustable arm 31 may be pivoted in order to set the switching point of the signalling gauge. A magnet 34 is connected to a pointer 35. The pointer 35 is rotated by motion of the shaft or stand 36 controlled by the gauge movement. (Not shown). Alternatively, the pointer may be rotated by a crankarm and pivoted on a shaft in embodiments with a fixed shaft.

Figure 4:
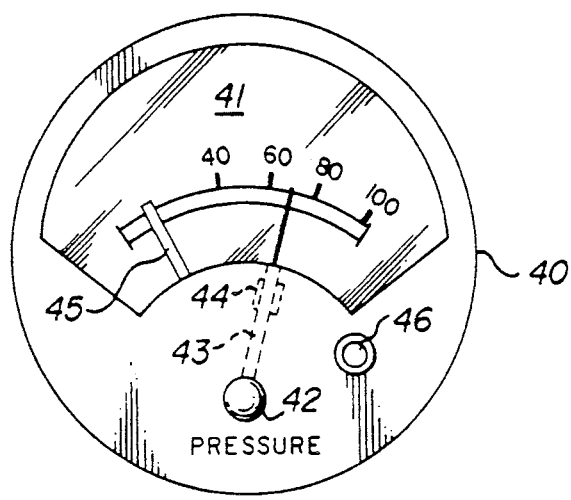
FIG. 4 shows a plain view of a signalling gauge according to the configuration of FIG. 3.
Figure 5:
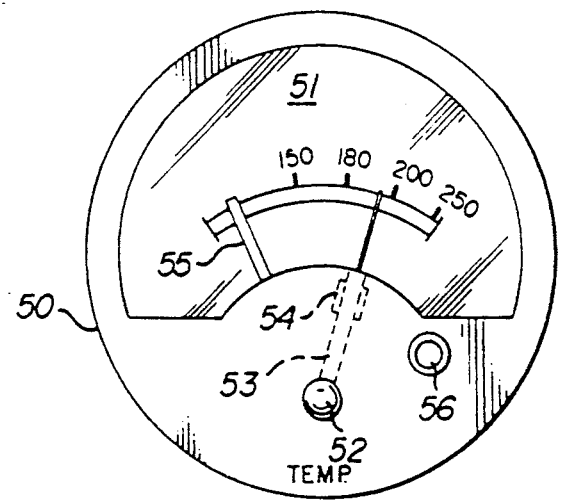
FIG. 5 shows a plain view of an alternative embodiment according to FIG. 3.

FIGS. 4 and 5 show two applications for the configuration illustrated in FIG. 3. Gauge 40 is adapted to monitor pressure while gauge 50 is adapted to monitor temperature. Each instrument contains a face plate 41, 51 which displays a graduated dial visible through a clear lens. Knobs 42, 52 are located on the front of the gauge and adapted to control the "contact" arms 43, 53. Each arm displays a Hall effect switching element 44, 54. An extension of the arm is provided as a visual indication of the location of the switch point. An indicating pointer 45, 55 is arranged to display the sensed reading of the gauge. The indicating pointers carry an activating magnet (not shown in the view of FIGS. 4 and 5) positioned to actuate or deactuate the Hall effect switching device on passage thereover. Each gauge may carry an LED signalling indicator 46, 56, as a visual indication that the predetermined set point has been attained. (optional)

Figure 6:
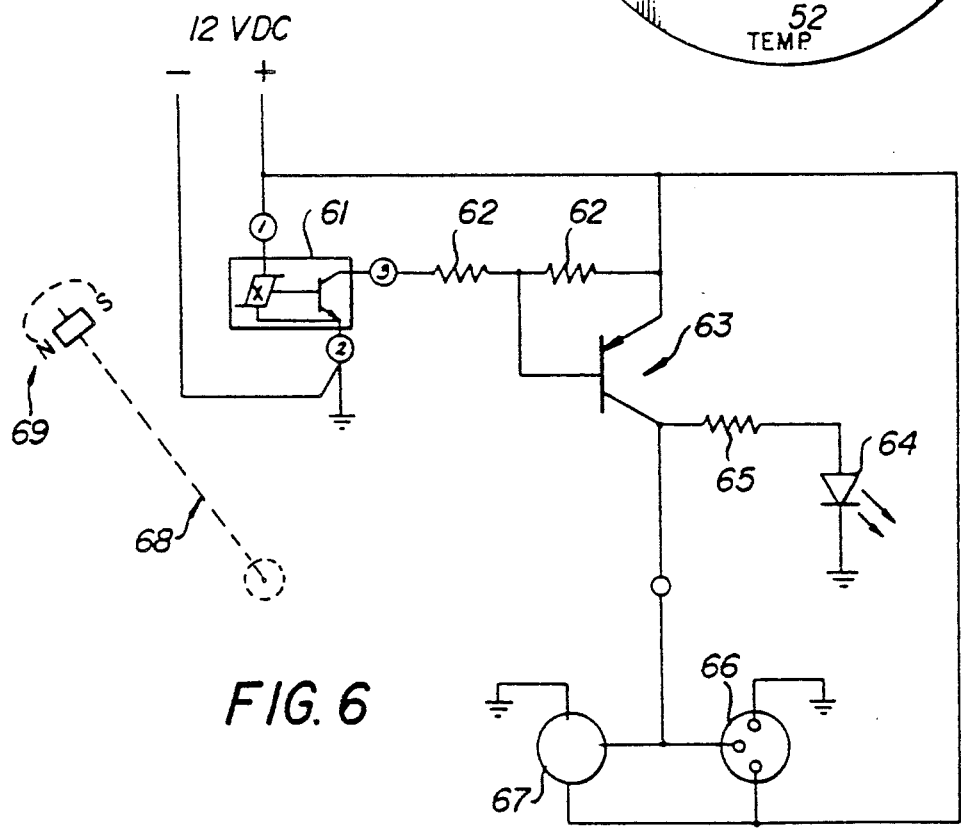
FIG. 6 shows a wiring diagram for an embodiment of a signalling gauge according to the invention.

FIG. 6 shows an electrical schematic of a signalling circuit according to an embodiment of the invention. A bipolar Hall effect digital latch 61 is utilized as the non-captivating magnetically actuated switch element. The Hall effect element may be a UGS-3075 manufactured by Sprague. The Hall effect element is connected through a voltage divider 62 to a switching transistor 63. The switching transistor may be connected to a signalling LED 64 through a resistor 65. Additionally, the switching transistor may be connected to control inputs of a flashing light element 66 and/or an electronic chime 67. In operation the indicating pointer, illustrated schematically at 68, sweeps the magnet 69 past the Hall effect element 61.

FIGS. 7 and 8 show a multiple contact signalling gauge. The signalling gauge is configured as a pressure meter 70. A pressure input port 71 is located on the pressure meter. Adjustable contact pointers 72 and 73 are connected to knobs 74 and 75 respectively. Adjustable pointer 73 carries a low set point Hall effect switch 76 and adjustable pointer 72 carries a high set point Hall effect switch 77. Switch elements 76 and 77 may advantageously be ultra-sensitive Hall effect switches such as SPRAGUE, UGS-3140 switches. The switch elements 76 and 77 are shown on the exterior sides of adjustable pointers 73 and 72 for illustrative purposes only. The switching elements in practice are located on an opposing side of the pointers, facing the meter indicating pointer 78 which bears a magnet 79. The low set point switch element 76 is connected to a low set point switch "on" LED 80. The high set point switch 77 is connected to a high set point switch "on" LED 81. According to an advantageous embodiment, this setup may be utilized in order to maintain pressure in a monitored tank between amounts called for according to the adjustable pointers. The meter may, for example, be connected to an auxiliary control circuit 82 which in turn controls a pump (not shown) through a series of switched contacts 83. The auxiliary control circuit 82 may be connected by a lead 84 and located remotely. The auxiliary control circuit may include a voltage regulator 85. The Hall effect switch elements may be connected to a flip-flop or latch circuit 86 which in turn controls a relay 87.

Figure 9:
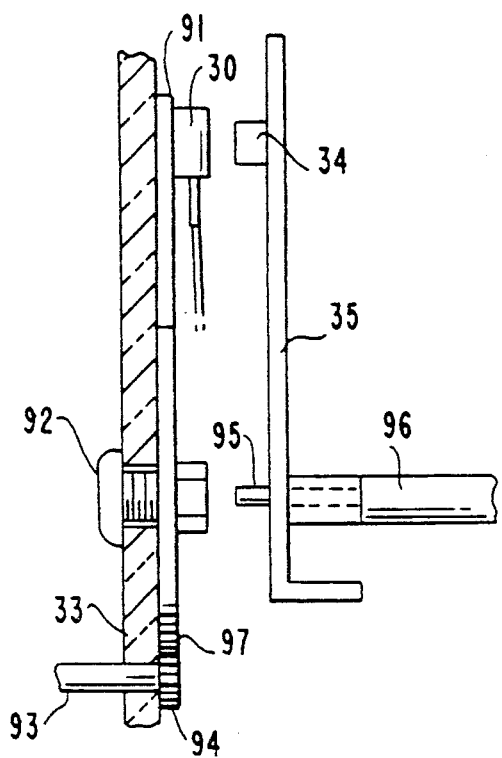
FIG. 9 shows a side view of a threshold adjustment mechanism.
Figure 10:
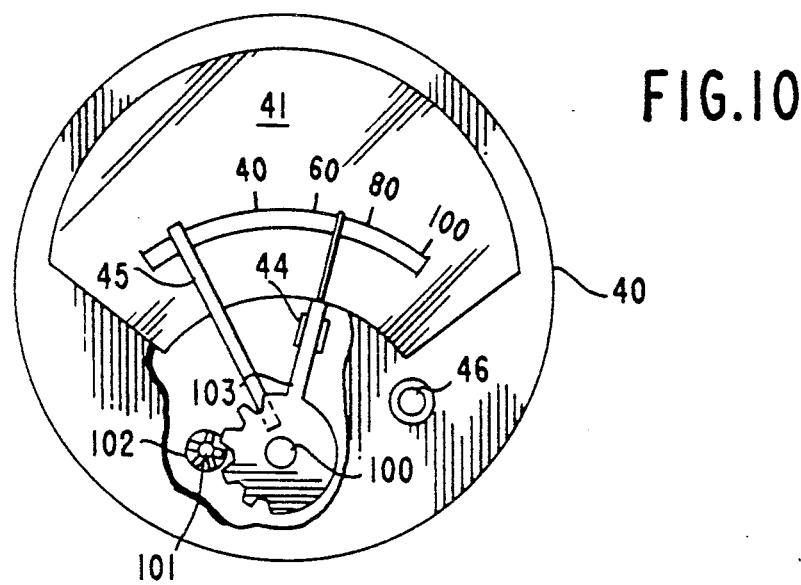
FIG. 10 shows a front view of a threshold adjustment mechanism.
Figure 11:
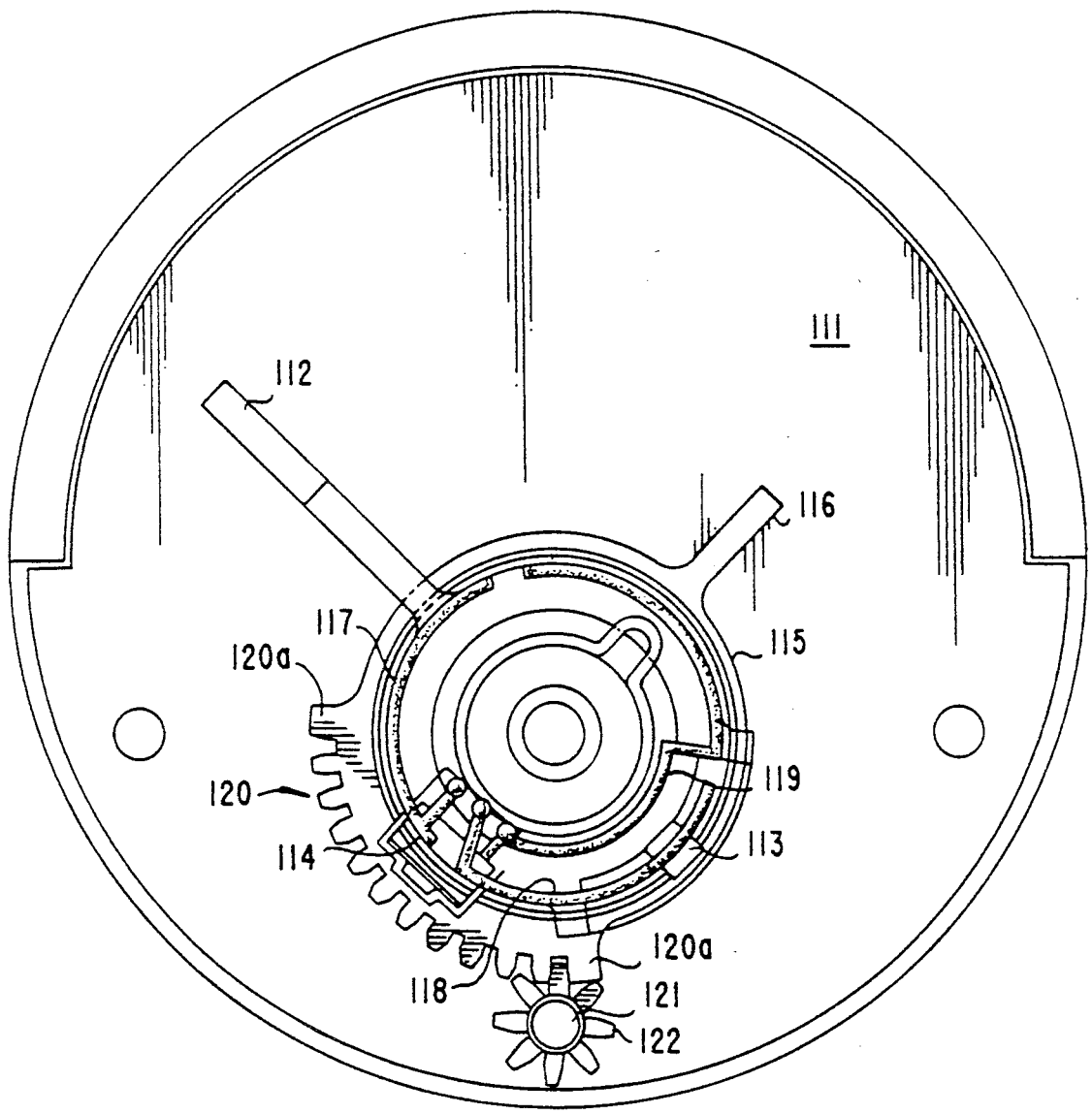
FIG. 11 shows an alternate configuration of a threshold adjustment mechanism.

FIGS. 9-11 show an advantageous adjustment arrangement for an adjustable contact setpoint. FIG. 9 shows an adjustable arm 91 which may be centrally pivoted at pivot 92 located on a clear lens 33. The adjustable arm carries a switching element illustrated in FIG. 9 as a Hall effect transistor 30. This Hall effect transistor is activated by a magnet 34 connected to a pointer 35. The adjustable contact setpoint may be utilized with other types of switching elements such as mechanical contacts, reed switches or optical sensors. The pointer 35 is rotated by a center pivot 95 located within a fixed shaft 96. An adjusting knob 93 passes through the lens. The adjusting knob bears a drive gear or tooth gear 94. The gear teeth engage cogs or teeth 97 located on pointer 91. The diameter of tooth gear 94 is relatively small compared to that of the adjustable setpoint contact cog 97.

FIG. 10 shows an adjustable setpoint gauge. A broken away view of the face plate is shown for illustration purposes. An adjustable pointer 103 is adjustable around a center pivot 100. An adjusting knob 101 connected to an adjusting gear 102 extends through the faceplate. The teeth of the adjusting gear engage teeth arranged in the adjustable pointer. Adjustment through the adjusting gear is an indirect adjustment which allows a finer tune adjustment and the combined effect of allowing a higher adjustment tension for the adjustable setpoint contact 103 and a low torque necessary to effect adjustment on knob 102.

FIG. 11 shows a detailed view of a different configuration of the gauge adjustment mechanism. The gauge exhibits a faceplate 111 which may have a graduated scale. Reading pointer 112 is controlled by a meter movement not shown. The reading pointer element carries a switch element 113 which may be, according to a particular embodiment, a small magnet. A second switch element 114 is located on an adjustable setpoint carrier 115. A pointer 116 gives a visual indication of the setpoint and extends from the adjustable setpoint element. According to the illustrated embodiment, the second switching element is a Hall effect transistor which is actuated by the magnet 113. Conductors 117, 118 and 119 are connected to the Hall effect transistor. The adjustable setpoint element 115 displays a curved tooth rack 120. An adjusting element 121 is connected to a gear element 122 arranged to cooperate with the tooth rack 120 in order to effect adjustment of the switching threshold indicated by setpoint indicator 116. Tooth rack 120 exhibits motion limiting stops 120a for limiting the motion or angular displacement of tooth rack 120. Motion limiting stops 120a are disposed along the ends of curved tooth rack 120. The conductors 117-119 may be connected to appropriate leads which may run to a control or indicator circuit.

The indirect adjustment mechanisms illustrated in FIGS. 9-11 yield significant advantages of ease of adjustability while maintaining adjustment under extreme operating conditions. The adjustment may be accurately made in a very user friendly fashion.

The illustrated embodiments are shown by way of example. The spirit and scope of the invention is not to be restricted by the preferred embodiment shown.

I claim:

1. An adjustable-set-point signalling gauge comprising:
    a gauge movement responsive to a sensed condition;
    means for indicating said sensed condition responsive to said gauge movement;
    means for setting a switching threshold mounted in a path of said means for indicating;
    means for indirectly adjusting said means for setting, said means for indirectly adjusting including stop means for stopping the motion of said means for indirectly adjusting beyond a predetermined displacement; and
    a drive connected to said means for indirectly adjusting said means for setting.

2. An adjustable-set-point signalling gauge according to claim 1, wherein said stop means is located on said means for indirectly adjusting.

3. An adjustable-set-point signalling gauge comprising:
    a gauge movement responsive to a sensed condition;
    means for indicating said sensed condition responsive to said gauge movement;
    means for setting a switching threshold mounted in a path of said means for indicating; and
    means for indirectly adjusting said means for setting, said means for indirectly adjusting including stop means for stopping the motion of said means for indirectly adjusting beyond a predetermined displacement.

4. An adjustable-set-point signalling gauge according to claim 3 wherein said means for indirectly adjusting is a means for amplifying adjustment torque.

5. An adjustable-set-point signalling gauge according to claim 4 further comprising means for signalling said threshold wherein said means for signalling comprises a first switch element mounted on said means for indicating and a second switch element mounted on said means for setting.

6. An adjustable-set-point signalling gauge according to claim 5 wherein said means for signalling a sensed threshold condition is an opto-electronic switch.

7. An adjustable-set-point signalling gauge according to claim 5 wherein said means for signalling a sensed threshold condition is a non-captivating, magnetically actuated switch element.

8. An adjustable-set-point signalling gauge according to claim 5 wherein said means for signalling a sensed threshold condition is an electromechanical switch.

9. An adjustable-set-point signalling gauge according to claim 5 wherein said means for signalling a sensed threshold condition is a magnetic switch.

10. An adjustable-set-point signalling gauge according to claim 3, wherein said stop means is located on said means for indirectly adjusting.

11. An adjustable-set-point signalling gauge comprising:
    a gauge movement responsive to a sensed condition;
    an indicating element comprising at least a pointer mounted on said gauge movement;
    a first switch element mounted on said indicating element;
    an adjustable-threshold set-point element carrying a second switch element;
    a plurality of gear teeth arranged on said set-point element;
    a drive gear mounted to cooperate with said teeth;
    an adjustment knob connected to said drive gear;
    a programmable logic controller responsive to said switch elements; and
    a motion limiter located in a plane of motion of said plurality of gear teeth and configured so motion of said plurality of gear teeth is prevented beyond a predetermined displacement.

12. An adjustable-set-point signalling gauge comprising:
    a gauge movement responsive to a sensed condition;
    an indicating element comprising at least a pointer mounted on said gauge movement;
    a first switch element mounted on said indicating element;
    an adjustable-threshold set-point element carrying a second switch element;
    a plurality of gear teeth arranged on said set-point element;
    a motion limiter located in a plane of motion of said plurality of gear teeth and configured so motion of said plurality of gear teeth is prevented beyond a predetermined displacement;
    a drive gear mounted to cooperate with said gear teeth; and
    an adjustment knob connected to said drive gear.

13. An adjustable-set-point signalling gauge according to claim 12 wherein:
    said first switch element is a magnet; and
    said second switch element is a non-captivating, magnetically actuated switch element mounted in an influence zone of a path of said magnet.

14. A gauge according to claim 13 wherein said second switch element is a Hall effect device.

15. A gauge according to claim 14 wherein said Hall effect device is mounted on a gauge face plate.

16. A gauge according to claim 15 wherein said Hall effect device is recessed into said face plate.

17. A gauge according to claim 15 wherein said Hall effect device is a bipolar Hall effect digital latch.

18. A gauge according to claim 17 wherein the axis of said magnet is aligned in said path and perpendicular to a sensing axis of said Hall effect digital latch.

19. A gauge according to claim 18 wherein a leading end of said magnet, during an increasing sensed condition, exhibits a flux polarity corresponding to an activating flux polarity of said Hall effect digital latch.

20. A gauge according to claim 17 further comprising: a control circuit responsive to said Hall effect digital latch.

21. A gauge according to claim 14 further comprising an indicator responsive to said Hall effect device.

22. A gauge according to claim 21 wherein said indicator is an optical indicator.

23. A gauge according to claim 21 wherein said indicator is an audio indicator.

24. A gauge according to claim 14 wherein said movement is a Bourdon tube or diaphragm type of movement.

25. A gauge according to claim 14 wherein said movement is an electrical movement.

26. A gauge according to claim 25 wherein said movement is a D'Arsonval type movement.

27. A gauge according to claim 14 wherein said Hall effect device is mounted on an adjustable member.

28. A gauge according to claim 27 further comprising a plurality of Hall effect devices mounted on adjustable members.

29. A gauge according to claim 28 wherein said Hall effect devices are switches; and further comprising at least; a latch connected to at least two of said switches.

30. A gauge according to claim 28 further comprising a control device connected to said Hall effect devices.

31. An adjustable-set-point signalling gauge according to claim 12, wherein said motion limiter is located on said plurality of gear teeth.

* * * * *